United States Patent Office 3,799,946
Patented Mar. 26, 1974

3,799,946
DIBENZO[b,d]PYRAN COMPOUNDS
Bernard Loev, Broomall, Pa., assignor to Smithkline Corporation, Philadelphia, Pa.
No Drawing. Filed Mar. 13, 1972, Ser. No. 234,380
Int. Cl. C07d 7/18
U.S. Cl. 260—345.3                 4 Claims

ABSTRACT OF THE DISCLOSURE

The compounds are dibenzo[b,d]pyrans having pharmacological activity such as central nervous system activity and gastric acid secretion inhibitory activity. A preferred compound is 3-(1,2-dimethylheptyl)-1-hydroxy-6,6,9-trimethyl-6H-dibenzo[b,d]pyran.

This invention relates to new dibenzo[b,d]pyrans having pharmacological activity.

The compounds of this invention are represented by the following formula:

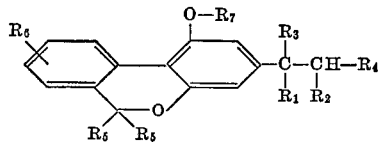

in which:

$R_1$ is hydrogen, methyl or ethyl and $R_2$ and $R_3$ are hydrogen or methyl, at least one of $R_1$, $R_2$ and $R_3$ being other than hydrogen;
$R_4$ is alkyl having 4–8 carbon atoms;
$R_5$ is methyl or ethyl;
$R_6$ is hydrogen, methyl or ethyl, $R_6$ being in the 8- or 9- position of the dibenzo[b,d]pyran ring; and
$R_7$ is hydrogen, lower alkyl having 1–4 carbon atoms or lower alkanoyl having 2–5 carbon atoms, said lower alkanoyl being optionally substituted by dimethylamino or diethylamino.

In the nomenclature used herein the dibenzo[b,d]pyran ring is numbered as follows:

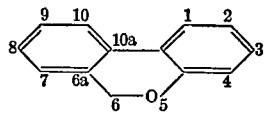

Preferred compounds of this invention are represented by Formula I in which $R_1$ is methyl and $R_2$ and $R_3$ are hydrogen or methyl.

Advantageous compounds of this invention are represented by Formula I in which $R_1$, $R_2$ and $R_5$ are methyl, $R_3$ is hydrogen, $R_4$ is n-pentyl, $R_6$ is methyl in the 9- position and $R_7$ is hydrogen or acetyl.

In particular, a preferred compound of this invention is 3-(1,2-dimethylheptyl) - 1 - hydroxy-6,6,9-trimethyl-6H-dibenzo[b,d]pyran. This compound is represented by the following formula:

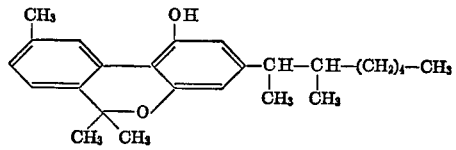

The compounds of Formula I may exist as optical isomers due to the asymmetry of carbon atoms in the side chain. The formulas presented herein are intended to include all of the isomers, including separated isomers and mixtures thereof.

The compounds of Formula I in which $R_7$ is hydrogen are prepared by dehydrogenation of the corresponding 7,8,9,10- (or 6a,7,8,10a or 6a,7,10,10a)-tetrahydro compounds. The dehydrogenation is carried out either using a catalyst such as palladium on carbon or using a chemical dehydrogenating agent such as 2,3-dichloro-5,6-dicyanoquinone.

The tetrahydrodibenzo[b,d]pyran starting materials are either known to the art or are prepared by known procedures. For example, the 7,8,9,10-tetrahydrodibenzo[b,d]pyrans are prepared by reacting an optionally substituted 2-carbethoxycyclohexanone with a 5-substituted resorcinol and reacting the resulting tetrahydrodibenzo[b,d]pyrone with a methyl or ethyl magnesium halide.

Alternatively, the compounds of Formula I in which $R_7$ is hydrogen may be prepared by condensing an optionally substituted o-halobenzoic acid with a 5-substituted 1,3-cyclohexanedione, dehydrogenating and then reacting the resulting dibenzo[b,d]pyrone with a methyl or ethyl magnesium halide.

The compounds of Formula I in which $R_7$ is lower alkyl or lower alkanoyl are prepared from the corresponding 7-hydroxy compounds by conventional methods. For example, the compounds in which $R_7$ is lower alkyl are prepared by reacting the 7-hydroxy compound with a lower alkyl halide or sulfate in the presence of a base. The compounds in which $R_7$ is lower alkanoyl, optionally substituted by dimethylamino or diethylamino, are prepared by reacting the corresponding 7-hydroxy compound with an optionally substituted lower alkanoic acid or lower alkanoyl halide, preferably in the presence of a condensation agent such as a tertiary amine or a carbodiimide. Alternatively, the compounds in which $R_7$ is unsubstituted lower alkanoyl are prepared by reacting the 7-hydroxy compound with a lower alkanoic anhydride.

The compounds of this invention have pharmacological activity such as central nervous system activity, for example the compounds have central nervous system depressant, sedative and tranquilizing activity. In addition, the compounds may have analgesic and hypotensive activity. Also, certain of the compounds, in particular compounds of Formula I in which $R_5$ is methyl and $R_6$ is hydrogen, methyl or ethyl in the 9-position, have gastric acid secretion inhibitory activity.

The central nervous system activity is demonstrated by oral administration to rats at doses of about 1.0 to about 100 mg./kg. to produce effects such as decreased motor activity.

The inhibition of gastric acid scretion is demonstrated by administration to chronic gastric fistula rats (Brodie et al., Amer. J. Physiol. 202:812–814, 1962) at doses of about 0.4 mg./kg. to about 50 mg./kg. orally. In this procedure, compounds which produce an increase in the gastric pH or a decrease in the volume of gastric juice or both are considered active.

One skilled in the art will recognize that in determining the amounts of the compound to produce the desired pharmacological effect, the activity of the compound as well as the size of the host animal must be considered.

The compounds of this invention may be combined with standard pharmaceutical carriers and administered internally in conventional dosage forms such as capsules, tablets or liquid preparations.

The following examples are not limiting but are illustrative of the compounds of this invention and processes for their preparation.

EXAMPLE 1

A solution of 10.0 g. (0.027 m.) of 3-(1,2-dimethylheptyl)-7,8,9,10-tetrahydro - 1 - hydroxy-6,6,9-trimethyl-6H-dibenzo[b,d]pyran in 100 ml. of anhydrous benzene is treated with 15.2 g. (0.067 m.) of 2,3-dichloro-5,6-dicyanoquinone in 250 ml. of anhydrous benzene and the resulting mixture is stirred for 3.5 hours at 25° C. The mixture is diluted with petroleum ether, the insoluble material is filtered off, the filtrate is evaporated, and the residue is chromatographed on silica to give 3-(1,2-dimethylheptyl)-1-hydroxy - 6,6,9 - trimethyl-6H-(dibenzo[b,d]pyran, B.P. 180–183° C. at 0.007 mm.

EXAMPLE 2

A solution of 2.0 g. of 3-(1,2-dimethyloctyl)-7,8,9,10-tetrahydro - 1 - hydroxy - 6,6,9 - trimethyl - 6H - dibenzo[b,d]pyran in 70 cc. of dry p-cymene is added dropwise at reflux to a well stirred suspension of 660 mg. of 10% palladium on carbon in 70 cc. of dry p-cymene, which is bubbled continuously with nitrogen. The addition is made over 45 minutes. Refluxing is continued for an additional hour, and the mixture is then cooled, chloroform is added and the catalyst is filtered off. The chloroform solution is evaporated in vacuo. The residue is chromatographed on a silica gel "dry-column" (20" x 1.5"), using 6:4 chloroform-cyclohexane as the eluant. The fractions are eluted and distilled to give 3-(1,2-dimethyloctyl)-1-hydroxy - 6,6,9 - trimethyl - 6H - dibenzol[b,d]pyran, B.P. 205–208° C. at 0.10 mm.

EXAMPLE 3

A solution of 2.5 g. (0.007 m.) of 3-(1,2-dimethylhexyl)-7,8,9,10 - tetrahydro - 1 - hydroxy - 6,6,9 - trimethyl-6H-dibenzo[b,d]pyran in 150 ml. of dry tetrahydrofuran at —10° C. is treated portionwise with a solution of 3.62 g. (0.016 m.) of 2,3-dichloro-5,6-dicyanoquinone in 100 cc. of dry tetrahydrofuran, at a rate to maintain the reaction temperature below 5° C. The mixture is stirred at 0° C. for one hour, then allowed to warm gradually to room temperature and then stirred for 12 hours.

The solvent is evaporated in vacuo and the residue is triturated with petroleum ether. The insoluble material is filtered off and the filtrate is evaporated to give an oil which is chromatographed on silica gel and then distilled at 205–210° C./0.005 mm. to give 3-(1,2-dimethylhexyl)-1-hydroxy-6,6,9-trimethyl-6H-dibenzo[b,d]pyran.

EXAMPLE 4

A solution of 1.0 g. of 3-(1,2-dimethylheptyl)-1-hydroxy-6,6,9-trimethyl-6H-dibenzol[b,d]pyran in 20 ml. of acetic anhydride containing 0.5 g. of sodium acetate is refluxed for five hours. The excess anhydride is evaporated in vacuo and the residue dissolved in water and extracted with ether. The extract is washed with water until neutral, then dried and evaporated to give an oil, which is chromatographed on a silica gel "dry-column" using 1:1 benzene-cyclohexane as eluant. Distillation at 195–197° C./0.025 mm. gives 1-acetoxy-3-(1,2-dimethylheptyl)-6,6,9-trimethyl-6H-dibenzo[b,d]pyran.

EXAMPLE 5

By the procedure of Example 4, using propionic anhydride in place of acetic anhydride, the product is 3-(1,2-dimethylheptyl)-6,6,9 - trimethyl - 1 - propionyl - oxy-6H-dibenzo[b,d]pyran.

Similarly, using n-butyric anhydride, the product is 1-n-butyryloxy-3-(1,2-dimethylheptyl) - 6,6,9 - trimethyl-6H-dibenzo[b,d]pyran.

By the same procedure, using n-valeric anhydride, the product is 3-(1,2-dimethylheptyl)-6,6,9-trimethyl-1-n-valeryloxy-6H-dibenzo[b,d]pyran.

EXAMPLE 6

To a solution of 2.5 g. (0.0068 m.) of 3-(1,2-dimethylheptyl)-1-hydroxy-6,6,9 - trimethyl - 6H - dibenzo[b,d]pyran in 60 ml. of dry dimethylsulfoxide is added 0.96 g. (0.0085 m.) of potassium t-butoxide, then 2.14 g. (0.017 m.) of methyl sulfate in 3 ml. of dimethylsulfoxide is added dropwise. The mixture is warmed to 100° C. for 30 minutes and then stirred at room temperature for 12 hours.

The mixture is poured onto ice-water, acidified with dilute hydrochloric acid and extracted several times with ether. The extracts are combined, washed with water, dried and evaporated to give an oil which is distilled at 188–190° C./0.01 mm. to give 3-(1,2-dimethylheptyl)-1-methoxy-6,6,9-trimethyl - 6H - dibenzo[b,d]pyran.

EXAMPLE 7

By the procedure of Example 6, using ethyl bromide in place of methyl sulfate, the product is 1-ethoxy-3-(1,2-dimethyl-heptyl) - 6,6,9 - trimethyl - 6H - dibenzo[b,d]pyran.

Similarly, using propyl bromide, the product is 3-(1,2-dimethylheptyl) - 6,6,9 - trimethyl - 1 - propoxy - 6H - dibenzo[b,d]pyran.

By the same procedure, using n-butyl bromide, the product is 1-n-butoxy-3-(1,2-dimethylheptyl)-6,6,9-trimethyl-6H-dibenzo[b,d]pyran.

EXAMPLE 8

To a freshly prepared solution of ethyl magnesium bromide (0.8 mole) in 400 cc. of dry ether, under nitrogen, is added portionwise 3,5-dimethoxybenzamide (36.2 g.) at a rate to maintain reflux. An additional 300 cc. of dry ether is added and the mixture is refluxed for 64 hours. The mixture is then poured onto ice-water which contains 50 cc. of concentrated sulfuric acid. The layers are separated and the aqueous layer is extracted with ether. The organic layer and the extracts are combined, washed with water and then with 5% aqueous sodium bicarbonate solution, then dried with magnesium sulfate and evaporated. The residue is vacuum distilled to give 3,5-dimethoxyphenyl ethyl ketone.

To a stirred suspension of 6.25 g. of magnesium turnings in 50 cc. of dry ether, under nitrogen, is added dropwise a solution of 43 g. of 1-bromohexane in 100 cc. of ether at a rate to maintain reflux. After the addition is complete, the refluxing is continued for 1.5 hours. The mixture is then cooled and a solution of 25 g. of 3,5-dimethoxyphenyl ethyl ketone in 100 cc. of dry ether is added dropwise at a rate to maintain reflux. The refluxing is then continued for 15 hours. To the mixture is added, dropwise, 75 cc. of saturated ammonium chloride solution. The layers are separated and the aqueous layer is extracted with ether. The organic layer and the extracts are combined, washed with water, dried with magnesium sulfate and evaporated to give 1,3-dimethoxy-5-(1-hydroxy-1-ethylheptyl)benzene.

1,3-dimethoxy-5-(1-hydroxy - 1 - ethylhephyl)benzene (29 g.) is dissolved in 200 cc. of dry benzene and the solution is treated with 1 cc. of methanesulfonic acid and then refluxed for 1.5 hours. The water is azeotroped off, replacing benzene as needed. Further benzene is added after the mixture cools and the mixture is extracted repeatedly with water, then dried with magnesium sulfate and evaporated. The residue is immediately dissolved in absolute ethanol and hydrogenated, using 600 mg. of 10% palladium/charcoal, at 50 p.s.i. for 30 minutes. The catalyst is filtered off and the solvent evaporated to give 1,3-dimethoxy-5-(1-ethylheptyl)benzene.

1,3-dimethoxy-5-(1-ethylheptyl)benzene (28 g.) is dissolved in a mixture of 225 cc. of acetic acid and 65 ml. of 48% hydrobromic acid and the resulting solution is stirred and refluxed overnight. The mixture is poured onto 300 cc. of ice-water and extracted twice with benzene. The extracts are combined, washed with water until neutral, then dried with magnesium sulfate and evaporated. The residue is distilled to give 5-(1-ethylheptyl)resorcinol.

To a mixture of 12 g. of 5-(1-ethylheptyl)resorcinol and 8.7 g. of 2-carbethoxy-5-methylcyclohexanone in 100 cc. of dry benzene is added at once 7.8 g. of phosphorus oxychloride. The mixture is stirred for 30 minutes, refluxed for 15 minutes, then stirred at room temperature overnight. Water (50 cc.) is added and the mixture is refluxed for 15 minutes. The mixture is cooled, extracted twice with ethyl acetate and the organic extract is washed with water and 5% aqueous sodium bicarbonate solution, then dried and evaporated. The residue is triturated with nitromethane and filtered. The solid material is recrystallized from nitromethane to give 3-(1-ethylheptyl)-7,8,9,10 - tetrahydro-1-hydroxy-9-methyl - 6H - dibenzo[b,d]pyrone.

To a stirred solution of 0.2 mole of methyl magnesium bromide in tetrahydrofuran/benzene, under nitrogen, is added a solution of 12.0 g. of 3-(1-ethylheptyl)-7,8,9,10-tetrahydro-1-hydroxy-9-methyl - 6H-dibenzo[b,d]pyrone in 150 cc. of dry tetrahydrofuran. The addition is made over 45 minutes and the mixture is refluxed overnight. The mixture is poured onto 400 cc. of ice-dilute hydrochloric acid. The layers are separated and the aqueous layer is extracted with benzene. The organic layer and the extracts are combined, washed with water, dried with magnesium sulfate and evaporated. The residue is dissolved in 150 cc. of dry benzene and treated with 20 ml. of ethereal hydrogen chloride. The mixture is refluxed for one hour, then cooled, washed with water and 5% aqueous sodium bicarbonate solution, dried and evaporated. The residue is immediately chromatographed on silica gel, using benzene as eluant. The product fraction upon evaporation gives an oil which is distilled to give 3-(1-ethylheptyl)-7,8,9,10-tetrahydro - 1 - hydroxy-6,6,9-trimethyl-6H-dibenzo[b,d]pyran.

By the procedure of Example 2, the above prepared tetrahydrodibenzo[b,d]pyran is dehydrogenated using palladium on carbon to give 3-(1-ethylheptyl)-1-hydroxy-6,6,9-trimethyl-6H-dibenzo[b,d]pyran, M.P. 76–77° C.

EXAMPLE 9

By the procedure described in Example 8, 2-carbethoxycyclohexanone is condensed with 5-(1,2-dimethylheptyl)resorcinol to give 3-(1,2-dimethylheptyl)-7,8,9,10-tetrahydro - 1 - hydroxy-6H-dibenzo[b,d]pyrone. The reaction of this dibenzopyrone with methyl magnesium bromide and working up by the procedure described in Example 8 gives 3 - (1,2-dimethylheptyl)-7,8,9,10-tetrahydro-1-hydroxy-6,6-dimethyl-6H-dibenzo[b,d]pyran.

The above prepared 1-hydroxy compound is refluxed with acetic anhydride containing sodium acetate by the procedure of Example 4 to give 1-acetoxy-3-(1,2-dimethylheptyl)-7,8,9,10-tetrahydro-6,6-dimethyl - 6H - dibenzo[b,d]pyran.

A mixture of 5.0 g. (0.012 m.) of 1-acetoxy-3-(1,2-dimethylheptyl)-7,8,9,10-tetrahydro - 6,6 - dimethyl-6H-dibenzo[b,d]pyran and 2.5 g. of 10% palladium on carbon is heated to 300° C. for 30 minutes under nitrogen. The mixture is cooled and diluted with chloroform. The catalyst is filtered off and the filtrate is evaporated to give a resin which is then dissolved in 5% ethanolic potassium hydroxide solution. The solution is refluxed for 40 minutes. The solvent is evaporated and the residue dissolved in water and acidified. Extraction with ether, then evaporation of the extracts gives a resin, which is chromatographed on silica to give 3-(1,2-dimethylheptyl)-1-hydroxy-6,6-dimethyl - 6H - dibenzo[b,d]pyran, B.P. 178–180° C. at 0.025 mm.

EXAMPLE 10

By the procedure described in Example 8, a three-fold excess of ethyl magnesium bromide is reacted with 3-(1,2-dimethylheptyl)-7,8,9,10-tetrahydro - 1 - hydroxy-9-methyl-6H-dibenzo[b,d]pyrone to give, after working up by the procedure of Example 8, 3-(1,2-dimethylheptyl)-6,6 - diethyl-7,8,9,10-tetrahydro - 1 - hydroxy-9-methyl-6H-dibenzo[b,d]pyran.

The above prepared 1-hydroxy compound is refluxed with acetic anhydride containing sodium acetate by the procedure of Example 4 to give 1 - acetoxy-3-(1,2-dimethylheptyl)-6,6-diethyl-7,8,9,10-tetrahydro - 9 - methyl-6H-dibenzo[b,d]pyran.

By the procedure of Example 9, the above prepared 1-acetoxy-3-(1,2-dimethylheptyl) - 6,6 - diethyl-7,8,9,10-tetrahydro - 9 - methyl-6H-dibenzo[b,d]pyran is heated with 10% palladium on carbon and the acetoxy group is hydrolyzed to give 3-(1,2-dimethylheptyl)-6,6-diethyl-1-hydroxy-9-methyl-6H - dibenzo[b,d]pyran, B.P. 230–235° C. at 0.05 mm.

EXAMPLE 11

By the procedure described in Example 8, 2-carbethoxy-5-ethylcyclohexanone is condensed with 5 - (1,2-dimethylheptyl)resorcinol and the resulting dibenzopyrone is converted to 3-(1,2-dimethylheptyl)-9-ethyl-7,8,9,10-tetrahydro-1-hydroxy - 6,6 - dimethyl-6H-dibenzo[b,d]pyran.

By the procedure of Example 2, the above prepared tetrahydrodibenzo[b,d]pyran is dehydrogenated using palladium on carbon to give 3-(1,2 - dimethylheptyl)-9-ethyl-1-hydroxy-6,6-dimethyl - 6H - dibenzo[b,d]pyran, B.P. 198–200° C. at 0.005 mm.

EXAMPLE 12

To a two-fold excess of methyl magnesium bromide in ether is slowly added 26 g. of 3,5-dimethoxyphenyl-α,α-dimethylacetonitrile in ether at a rate to maintain gentle reflux. The mixture is refluxed for 18 hours and then poured onto an ice water-hydrochloric acid mixture and allowed to come to room temperature. The layers are separated and the aqueous layer is extracted with ether. The organic layer and extracts are combined, washed with water, dried with magnesium sulfate and evaporated. The residue is distilled under high vacuum to give 3,5-dimethoxy-α,α-dimethylbenzyl methyl ketone.

By the procedure described in Example 8, 3,5-dimethoxy-α,α-dimethylbenzyl methyl ketone is reacted with n-hexyl magnesium bromide, the resulting 1,3-dimethoxy-5-(2-hydroxy-1,1,2-trimethyloctyl)benzene is dehydrated and reduced and the methoxy groups are demethylated. In the same manner as described in Example 8, the resulting 5-(1,1,2-trimethyloctyl)resorcinol is reacted with 2-carbethoxy-5-methylcyclohexanone and the resulting dibenzopyrone is converted to 7,8,9,10-tetrahydro-1-hydroxy-6,6,9-trimethyl - 3 - (1,1,2-trimethyloctyl)-6H-dibenzo[b,d]pyran.

The above prepared tetrahydrodibenzopyran is dehydrogenated by the procedure of Example 2 to give 1-hydroxy-6,6,9-trimethyl - 3 - (1,1,2-trimethyloctyl)-6H-dibenzo[b,d]pyran.

EXAMPLE 13

5-(2 - methylheptyl)resorcinol (prepared by reacting 3,5-dimethoxybenzonitrile with 2-heptyl magnesium bromide, reducing the resulting 3,5-dimethoxyphenyl 2-heptyl ketone and demethylating the methoxy groups) is reacted with 2-carbethoxy-5-methylcyclohexanone and the resulting dibenzopyrone is converted to 7,8,9,10-tetrahydro-1-hydroxy-6,6,9-trimethyl - 3 - (2-methylheptyl)-6H-dibenzo[b,d]pyran by the procedure of Example 8.

The above prepared tetrahydrobenzopyran is dehydrogenated by the procedure of Example 2 to give 1-hydroxy-6,6,9-trimethyl-3-(2 - methylheptyl)-6H-dibenzo[b,d]pyran, B.P. 215–217° C. at about 0.004 mm.

EXAMPLE 14

By the procedure of Example 2, the following tetrahydrodibenzo[b,d]pyrans are dehydrogenated:

7,8,9,10-tetrahydro-1-hydroxy-6,6,9-trimethyl-3-(1-methylhexyl)-6H-dibenzo[b,d]pyran
7,8,9,10-tetrahydro-1-hydroxy-6,6,9-trimethyl-3-(1-methylheptyl)-6H-dibenzo[b,d]pyran 7,8,9,10-tetrahydro-1-hydroxy-6,6,9-trimethyl-3-(1-methyloctyl)-6H-dibenzo[b,d]pyran
3-(1,1-dimethylheptyl)-7,8,9,10-tetrahydro-1-hydroxy-6,6,9-trimethyl-6H-dibenzo[b,d]pyran to give the following products, respectively:

1-hydroxy-6,6,9-trimethyl-3-(1-methylhexyl)-6H-dibenzo[b,d]pyran
1-hydroxy-6,6,9-trimethyl-3-(1-methylheptyl)-6H-dibenzo[b,d]pyran
1-hydroxy-6,6,9-trimethyl-3-(1-methyloctyl)-6H-dibenzo[b,d]pyran
3-(1,1-dimethylheptyl)-1-hydroxy-6,6,9-trimethyl-6H-dibenzo[b,d]pyran.

EXAMPLE 15

2-carbethoxy - 4 - methylcyclohexanone (17 g.) is condensed with 23.5 g. of 5-(1,2-dimethylheptyl)resorcinol by the procedure described in Example 8 and the resulting dibenzopyrone is reacted with methyl magnesium bromide to give 3-(1,2-dimethylheptyl)-7,8,9,10-tetrahydro-1-hydroxy-6,6,8-trimethyl-6H-dibenzo[b,d]pyran.

The above prepared tetrahydrodibenzopyran is dehydrogenated by the procedure of Example 2 to give 3-(1,2-dimethylheptyl)-1-hydroxy-6,6,8-trimethyl - 6H - dibenzo-[b,d]pyran, B.P. 195–197° C. at 0.005 mm.

EXAMPLE 16

By the procedure of Example 12, 3,5-dimethoxyphenyl-α-methylacetonitrile is converted to 3,5-dimethoxy-α-methylbenzyl methyl ketone, then by the procedure of Example 8 this ketone is reacted with n-octyl magnesium bromide, and the resulting 1,3-dimethoxy-5-(2-hydroxy-1,2-dimethyldecyl)benzene is dehydrated and reduced and the methoxy groups are demethylated to give 5-(1,2-dimethyldecyl)resorcinol.

In the same manner as described in Example 8, 5-(1,2-dimethyldecyl)resorcinol is reacted with 2-carbethoxy-5-methylcyclohexanone and the resulting dibenzopyrone is converted to 3-(1,2-dimethyldecyl)-7,8,9,10-tetrahydro-1-hydroxy-6,6,9-trimethyl-6H-dibenzo[b,d]pyran.

The above prepared tetrahydrodibenzopyran is dehydrogentaed by the procedure of Example 2 to give 3-(1,2-dimethyldecyl)-1-hydroxy - 6,6,9 - trimethyl-6H-dibenzo-[b,d]pyran.

EXAMPLE 17

A mixture of 2.0 g. of 3-(1,2-dimethylheptyl)-1-hydroxy-6,6,9-trimethyl-6H-dibenzo[b,d]pyran, 1.2 g. of 3-dimethylaminopropionic acid and 1.4 g. of dicyclohexylcarbodiimide in 100 ml. of dioxane is stirred at room temperature for 18 hours. The mixture is filtered and the filtrate is concentrated in vacuo. Ether is added to the residue. Then water is added and the mixture is shaken and the layers are separated. The organic layer is dried and concentrated to give 1-(3-dimethylaminopropionyloxy)-3-(1,2-dimethylheptyl) - 6,6,9 - trimethyl-6H-dibenzo[b,d]pyran.

By the same procedure, using 3-diethylaminopropionic acid, the product is 1 - (3 - diethylaminopropionyloxy)-3-(1,2-dimethylheptyl) - 6,6,9 - trimethyl-6H-dibenzo[b,d]pyran.

In the same manner, using 4-dimethylaminobutyric acid, the product is 1-(4-dimethylaminobutyroyloxy)-3-(1,2-dimethylheptyl)-6,6,9-trimethyl-6H-dibenzo[b,d]pyran.

EXAMPLE 18

By the procedure of Example 2, using 3-(threo-(—)-1,2-dimethylheptyl)-7,8,9,10-tetrahydro - 1 - hydroxy-6,6,9-trimethyl - 6H - dibenzo[b,d]pyran, the product is 3-(threo-(—)-1,2-dimethylheptyl) - 1 - hydroxy-6,6,9-trimethyl-6H-dibenzo[b,d]-pyran.

What is claimed is:

1. A compound of the formula:

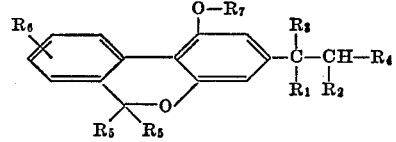

in which:
R₁ is hydrogen, methyl or ethyl and R₂ and R₃ are hydrogen or methyl, at least one of R₁, R₂ and R₃ being other than hydrogen;
R₄ is alkyl having 4–8 carbon atoms;
R₅ is methyl or ethyl;
R₆ is hydrogen, methyl or ethyl, R₆ being in the 8- or 9-position of the dibenzo[b,d]pyran ring; and
R₇ is hydrogen, lower alkyl having 1–4 carbon atoms or lower alkanoyl having 2–5 carbon atoms, said lower alkanoxyl being optionally substituted by dimethylamino or diethylamino.

2. A compound of claim 1 in which R₁ is methyl and R₂ and R₃ are hydrogen or methyl.

3. A compound of claim 1 in which R₁, R₂ and R₅ are methyl, R₃ is hydrogen, R₄ is n-pentyl, R₆ is methyl in the 9-position and R₇ is hydrogen or acetyl.

4. A compound of claim 1, said compound being 3-(1,2-dimethylheptyl)-1-hydroxy - 6,6,9 - trimethyl-6H-dibenzo[b,d]pyran.

References Cited

UNITED STATES PATENTS 2,419,936    5/1947    Adams _____ 260—345.3

OTHER REFERENCES

Gaoni et al., J. Am. Chem. Soc., vol. 86, p. 1646–7 (1964) QD 1. A5

JOHN M. FORD, Primary Examiner

U.S. Cl. X.R.

424—283

PO-1050
(5/69)

UNITED STATES PATENT OFFICE
CERTIFICATE OF CORRECTION

Patent No. 3,799,946   Dated March 26, 1974

Inventor(s) Bernard Loev

It is certified that error appears in the above-identified patent and that said Letters Patent are hereby corrected as shown below:

Column 1, below line 20 and above the formula insert
--- FORMULA I --- .

Column 8, line 6, dimethylaminobutyroyloxy should read dimethylaminobutyryloxy .

Column 8, line 35, alkanoxyl should read alkanoyl .

Signed and sealed this 22nd day of October 1974.

(SEAL)
Attest:

McCOY M. GIBSON JR.
Attesting Officer

C. MARSHALL DANN
Commissioner of Patents